United States Patent [19]

Mehra

[11] Patent Number: 4,588,095

[45] Date of Patent: May 13, 1986

[54] SINGLE-PIECE INJECTION MOLDED RACK

[75] Inventor: Ravinder C. Mehra, Fairport, N.Y.

[73] Assignee: Sybron Corporation, Rochester, N.Y.

[21] Appl. No.: 550,574

[22] Filed: Nov. 10, 1983

[51] Int. Cl.[4] .......................................... A47B 73/00
[52] U.S. Cl. ..................................... 211/74; 211/126
[58] Field of Search ............... 211/74, 70.6, 181, 126, 211/60.1, 71; D24/31, 32

[56] References Cited

U.S. PATENT DOCUMENTS

| | | | |
|---|---|---|---|
| D. 257,390 | 10/1980 | Hahn | D24/32 |
| D. 264,157 | 5/1982 | Karsihas | D6/85 |
| D. 265,126 | 6/1982 | Beall | D24/32 |
| 2,556,590 | 6/1951 | Long | |
| 2,566,817 | 9/1951 | Yellin | |
| 3,154,209 | 10/1964 | Wilhite et al. | 211/74 X |
| 3,184,071 | 5/1965 | Delaire | |
| 3,338,807 | 8/1967 | Clifford | |
| 3,379,315 | 4/1968 | Broadwin | 211/189 X |
| 3,424,831 | 1/1969 | Spatz | |
| 3,456,913 | 7/1969 | Lutz | |
| 3,473,197 | 10/1969 | Wilds et al. | |
| 3,509,603 | 5/1970 | Halsall et al. | |
| 3,532,221 | 10/1970 | Kaluhiokalani | 211/70.6 |
| 3,564,660 | 2/1971 | Darnell | |
| 3,603,272 | 9/1971 | Ditges | 108/51 |
| 3,604,566 | 9/1971 | Rern et al. | 211/74 |
| 3,700,205 | 10/1972 | Ditges | 249/142 |
| 3,731,899 | 5/1973 | Nuzzo | 249/142 |
| 3,767,156 | 10/1973 | Sullivan et al. | 249/107 |
| 3,778,232 | 12/1973 | McMorrow | D24/32 X |
| 3,784,044 | 1/1974 | Bruggeman | 211/181 X |
| 3,856,256 | 12/1974 | Celesti | 249/66 |
| 3,930,780 | 1/1976 | Lovejoy | 425/249 |
| 3,972,737 | 8/1976 | Sullivan et al. | 136/166 |
| 4,023,769 | 5/1977 | Andrews, Jr. | 249/64 |
| 4,029,728 | 6/1977 | Sharp et al. | 264/278 |
| 4,040,595 | 8/1977 | Tecco | 249/68 |
| 4,124,122 | 11/1978 | Emmitt | 211/74 |
| 4,235,410 | 11/1980 | Nelson | 249/60 |
| 4,264,295 | 4/1981 | Hingley | 425/577 |
| 4,273,416 | 6/1981 | Blum | 350/239 |
| 4,281,768 | 8/1981 | Sommers | 211/74 |
| 4,284,603 | 8/1981 | Koron | 422/101 |
| 4,328,945 | 5/1982 | Perkins | 249/67 |
| 4,330,257 | 5/1982 | Rees et al. | 425/556 |
| 4,332,537 | 6/1982 | Slepcevic | 425/121 |
| 4,362,290 | 12/1982 | Marx et al. | 249/60 |
| 4,407,958 | 10/1983 | De Groff | D24/32 X |
| 4,495,150 | 1/1985 | Cook | 211/74 X |

Primary Examiner—Ramon S. Britts
Assistant Examiner—Sarah A. Lechok Eley
Attorney, Agent, or Firm—Robert A. Gerlach; Frank Pincelli; John B. Mason

[57] ABSTRACT

A single-piece, injection molded rack for holding test tubes or similar articles and a mold for producing the same. In a preferred three-tiered form, the intermediate tier is a lattice defined by the intersection of two superposed sets of parallel bars. These two sets of bars are formed by two pairs of correspondingly channeled slides that cooperatively engage to form a portion of the mold cavity corresponding to the lattice. The channels in each set of slides are aligned with the path of movement of the slides to permit their sliding, uniaxial movement relative to the molded bars. To further enable this sliding movement between mold segments and the molded rack, the connecting supports between the top tier and the intermediate tier are provided on the sides of the rack, while the connecting supports between the intermediate tier and the bottom tier are provided on the front and rear of the rack. With this arrangement, the slides that form the lattice of the intermediate tier are free to slide, as well, along the inner surfaces of the supports, which they also help to form.

36 Claims, 11 Drawing Figures

SINGLE-PIECE INJECTION MOLDED RACK

BACKGROUND OF THE INVENTION

The present invention relates generally to the manufacture of injection molded articles and, more particularly, to a single-piece injection molded rack and the mold for producing the same. In a preferred form, the invention is advantageously employed to provide a plastic test tube rack for medical and laboratory use.

Test tube racks are widely used where it is desirable to perform biological or chemical tests in a related sequence or on a related group of specimens. Before performing such tests it is frequently necessary to simultaneously sterilize the test tubes and rack. Many operations, as well, require that the rack, test tubes, and their contents be placed in an incubator to facilitate the chemical reaction or growth of organisms within the media under test. Often, the autoclaves or incubators available to a particular laboratory have limited internal space, making it highly desirable to have a rack that will hold a dense array of test tubes.

As test tubes are more tightly grouped, however, it becomes necessary that the individual tubes be maintained in proper alignment so that material may be introduced or withdrawn from the tubes in an orderly, sequential manner. As well, the contents of the tube must remain readily observable by the technician.

The conventional wire rack is extensively employed in an effort to achieve these goals. Typically, such racks are three-tiered structures, the individual tiers being rectangular grids formed by welding together individual metal rods. The tiers are then operatively joined by welding additional metal rods to each tier, vertically from top to bottom. The completed assembly is thereafter coated with a thin layer of conforming plastic to protect the metal against corrosion and chemical attack. However, with usage, the plastic coating wears off, leading to rust and corrosion which render the racks unusable.

While such wire racks function satisfactorily, they are costly to produce and, because of their weight, costly to ship in quantity. These costs are shared by the end user, making wire racks economically unsuitable for use as a disposable item of laboratory equipment. These racks, thus, are ill suited for analytical operations in which the hazardous substances used dictate disposal of both test tubes and racks.

For such hazardous procedures, test tubes made of plastic are commercially attractive. Although a number of plastic test tube racks has been heretofore proposed, none has achieved the dense packing and tube visibility advantages of the wire rack. The usual approach of such plastic racks has been to provide multiple plastic plates, each of the plates having a plurality of apertures for receiving the test tubes. Typically, the apertures are circular to conform to the shape of the test tubes. Often the plates are separately molded and thereafter assembled using other separately molded components. Since these single plates are relatively thin, they are easily formed by a simple mold section having projecting circular cores that cooperatively mate against a planar mold half. The general design and construction of steel injection molds, however, does not allow for compact and dense placement of metal cores to mold holes for various reasons. For example, the steel sections between the cores that mold the holes become too thin and flimsy for practical application. Also, the effective placement of cooling channels becomes impractical. Consequently, these multilevel plastic test tube racks have generally widely spaced apertures and are assembled from several separately molded components.

In addition to the limitation on aperture density, this type of plastic test tube rack requires assembly, thus yielding up some of the cost benefits associated with plastic manufacture. It would be most desirable if a plastic test tube rack could be manufactured as a single piece in a fully automated mold. It would be particularly advantageous if such a rack could also provide the dense two-dimensional test tube arrays and high visibility afforded by wire racks.

The present invention achieves the objectives of equalling the test tube density and viewability advantages of the wire rack. In accomplishing these objectives in a single-piece, one-shot injection molding operation, the present invention significantly reduces the manufacturing cost associated with assembling a wire rack from individual metal rods as described above. As a consequence, the present invention provides a rack that can be offered more economically to the end user. Since the unique configurations of both the rack and the mold are adapted to a wide variety of plastic materials, racks can be produced to exhibit functional characteristics ranging from durability and reusability to single-use disposability.

SUMMARY OF THE INVENTION

In accordance with the invention, there is provided a multitier rack for holding an array of test tubes or similar articles. Advantageously, the rack is constructed as a single piece in a one-shot molding operation. The unique construction of the rack and, in particular, the configuration of the intermediate tier, permits close spacing of the apertures while at the same time minimizing the required thickness of the walls between apertures. An overall airy appearance results, greatly facilitating viewing the contents of test tubes held by the track. While the invention will be described throughout with respect to a three-tiered rack, from the ensuing description it will become apparent to those skilled in the art that more than one intermediate tier may be included in the structure.

In accordance with an aspect of the invention, the intermediate tier is a lattice having apertures defined by the selective intersection of two sets of bars. As used herein, the term "set" is meant to encompass a single bar, a group of bars, and an assemblage of groups of bars. In the preferred embodiment, a top set of substantially parallel bars is superposed over a bottom set of substantially parallel bars, at right angles, to define generally rectangular apertures. When used in reference to bars, the phrase "substantially parallel" means that the longitudinal axis of a bar is aligned parallel to the longitudinal axis of another bar (or to the longitudinal axes of other bars), or parallel to some other reference axis or plane. This preferred configuration enables formation of the intermediate tier with as few as two mold segments. In simplest form, each set of bars is formed by a slide that has parallel channels milled into a substantially planar surface. The two channel-containing surfaces are moved into and out of face-to-face engagement with each other along separate, single axial paths that are oriented relative to one another in accordance with the desired angle of intersection of the two sets of bars. To yield the preferred lattice with rectangular apertures, the axial path of movement of the slide forming the bottom set of bars is perpendicular to the axial path of movement of the slide forming the top set of bars. Since all of the channel-containing surfaces are substantially planar, when the mold is closed, the respective surfaces mate perfectly in the regions corresponding to the apertures in the lattice. Where the channels that form the top set of bars overlap and intersect the channels forming the bottom set of bars, injected plastic flows freely to enable single-piece construction of the lattice. Since the channels are aligned parallel to the axial path of movement of the slides, the bars that they form are likewise oriented in parallel relation to the movement of the slide. Thus, when the molded rack has cooled, the slides are easily withdrawn away from the molded rack and away from one another along their respective single axial paths with the channels sliding along the formed bars.

Since the lattice formed by these simply moved slides is without undercuts, it will be appreciated that a single-piece rack having more than one intermediate tier may be easily formed. For such a multiple-intermediate tier arrangement, the bars on the facing surfaces of adjacent intermediate tiers would be parallel to one another and, in turn, parallel to the facing bars on the adjacent tier. For example, the top bars on a given intermediate tier would be parallel to the bottom bars on the intermediate tier immediately above it, while the bottom bars thereof would be parallel to the top bars on the intermediate tier immediately below it.

While the formation of the preferred configuration of superposed parallel bars has been described in relation to a single slide for each of the top and bottom sets of bars, the invention contemplates the use of plural cooperating slides to form either one or both of the sets of bars. In accordance with the preferred mold of the invention, each set of bars is formed by a pair of cooperating slides that are movable along coaxial paths in opposed directions relative to one another. Each bar is formed by a pair of channels (one channel being provided on each of the opposed slides), which mate end to end when the mold is closed. In similar fashion to the single slide arrangement, the pairs of channels are aligned parallel to the axial path of movement of the opposed slides. Thus, when the molded rack is cooled, the slides are withdrawn in opposed directions away from one another and away from the molded rack along their coaxial paths with the channels sliding over the portions of the bars they formed. This arrangement of cooperating pairs of slides advantageously permits the formation of supports between the top and intermediate tiers and between the bottom and intermediate tiers. This is accomplished by providing channels in the mating faces of the cooperating slides. By selecting unequal lengths for the slides within a pair, the supports may be positioned where desired between the facing surfaces of the tiers. As well, by selecting the number and configuration of channels in the mating faces of the slides, a plurality of supports may be formed.

Although preferred, it is not essential that the bars within each of the sets be parallel. For example, where a set of bars consists of groups of bars, the bars within a particular group may be parallel to one another but not necessarily parallel to the bars within another group of the set. Similarly, it is preferred but not essential that the bars within each set extend the full length between edges of the intermediate tier.

According to yet another aspect of the invention, to provide rigidity to the rack and to maintain simplicity in the configuration of the mold segments, the supports that join the tiers together do not extend the full vertical span from top to intermediate to bottom tier. Instead, the top tier is interconnected with the intermediate tier and, in turn, the intermediate tier is separately connected at another place to the bottom tier. In the preferred form, the top and intermediate tiers are connected at their extreme side edges by side supports whose facing inner surfaces are substantially planar and parallel to one another. With this configuration, the side supports are readily formed by side surfaces of the mold slides that form the top set of parallel bars. Similarly, the supports connecting the intermediate tier to the bottom tier have substantially planar, parallel inner surfaces. As with the side supports between top and intermediate tiers, the supports between the intermediate and bottom tiers are formed by front and back side surfaces of the slides that form the bottom set of bars. Thus, in the preferred right-angle disposition of the two sets of bars forming the intermediate tier, the side supports and front and back supports have surfaces lying in planes that are also perpendicular to one another. This arrangement not only simplifies mold design and enhances the rigidity of the rack, but also aids the observation of the test tube contents from different perspectives.

BRIEF DESCRIPTION OF THE DRAWINGS

The invention can best be understood by the following portion of the specification taken in conjunction with the accompanying drawings in which.

DETAILED DESCRIPTION OF THE PREFERRED EMBODIMENT

Figure 1:
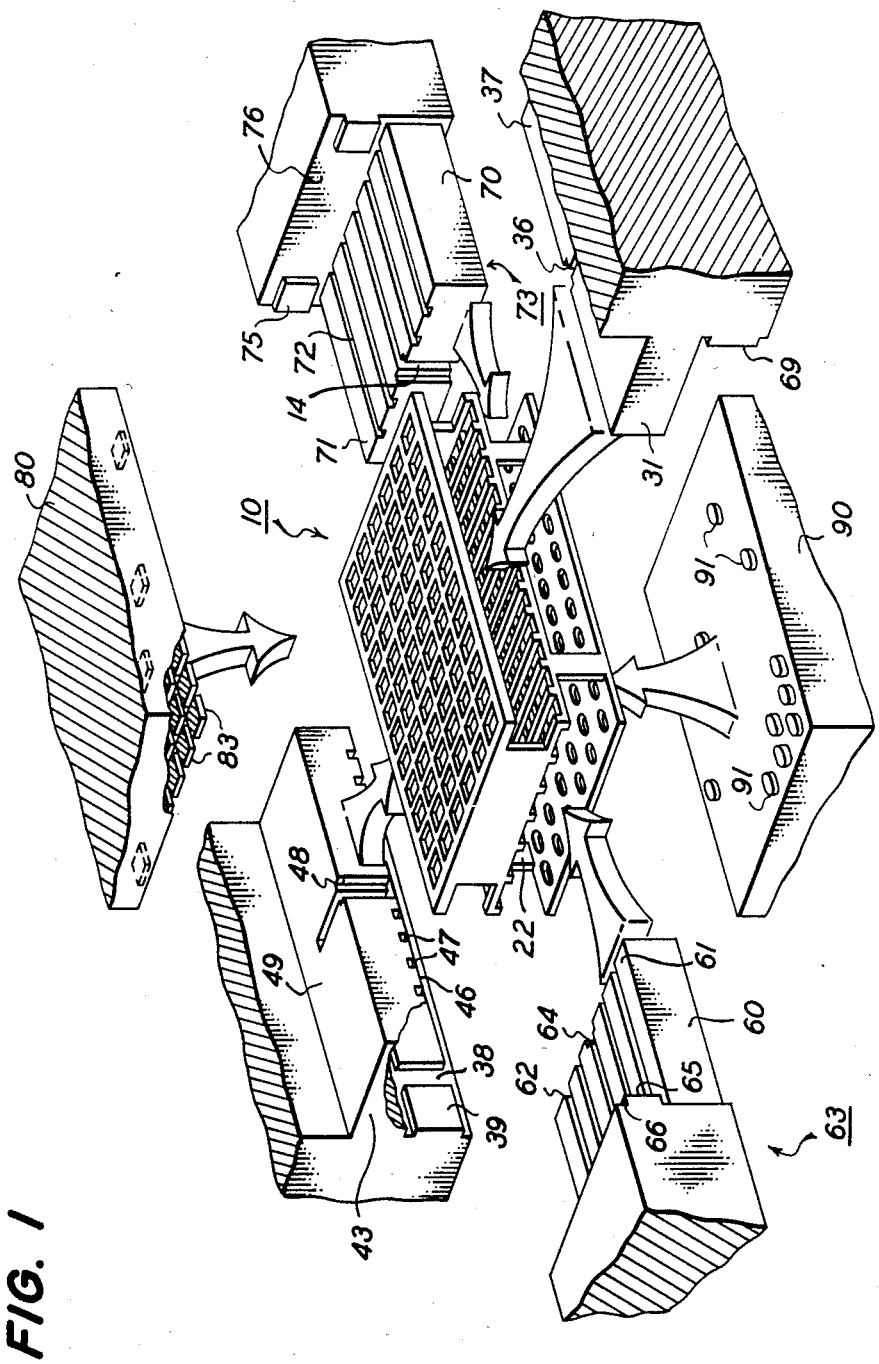
FIG. 1 is a modified perspective view of one form of rack according to the invention showing an exploded diagrammatic illustration of the inventive mold for the rack.

FIG. 1 diagrammatically illustrates the relationship and relative movement among the mold segments that cooperate in the closed position to form a mold cavity corresponding to the illustrated rack 10. This cooperative action can be appreciated more fully with a better understanding of the configuration of the preferred rack illustrated in FIG. 1 and in greater detail in FIGS. 2 through 6.

To facilitate an understanding of this invention, the following arbitrary directional convention has been adopted. The use of this convention is not, however, intended to limit the scope of the appended claims. With this in mind, in FIGS. 1 and 2, the elongate side of the rack closest to the viewer is considered front, while the shorter side of the rack closest to the viewer is considered left. Thus, from these reference directions, the directions right, rear, upper, and lower on both the rack and the mold follow the natural inclinations of the viewer from the given perspective.

Figure 2:
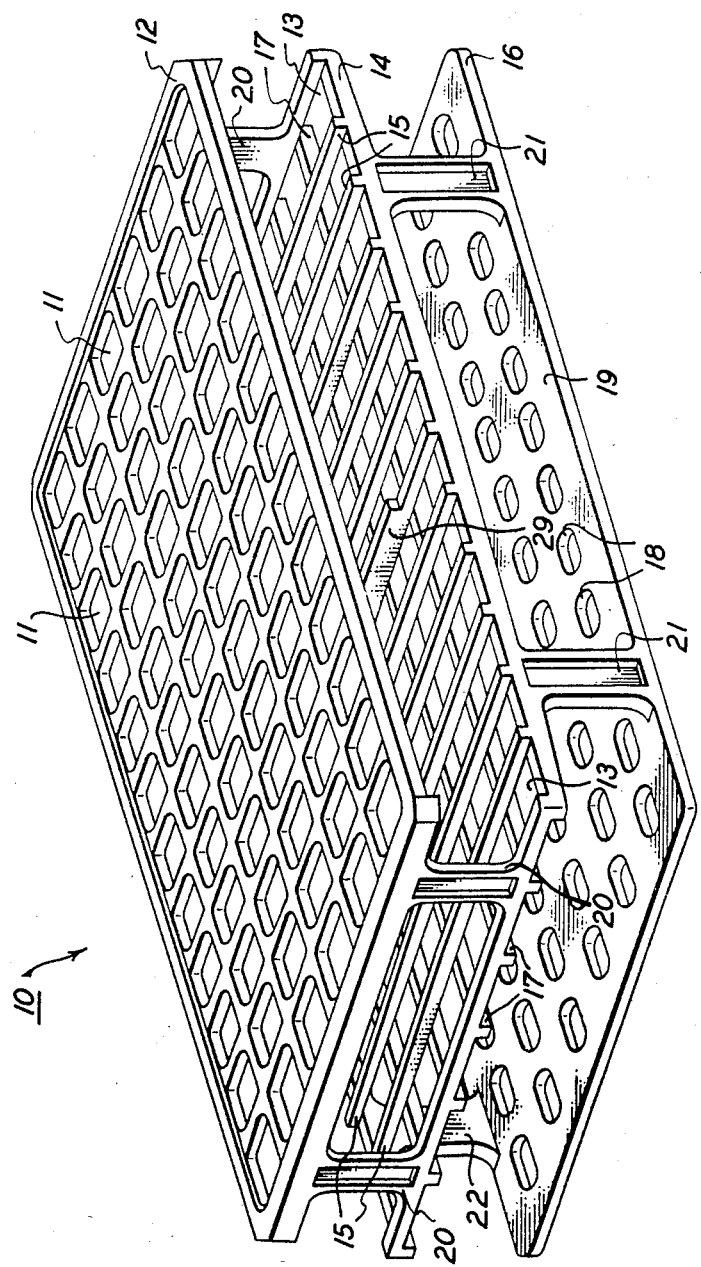
FIG. 2 is a modified perspective view of a preferred form of the rack.
Figure 3:
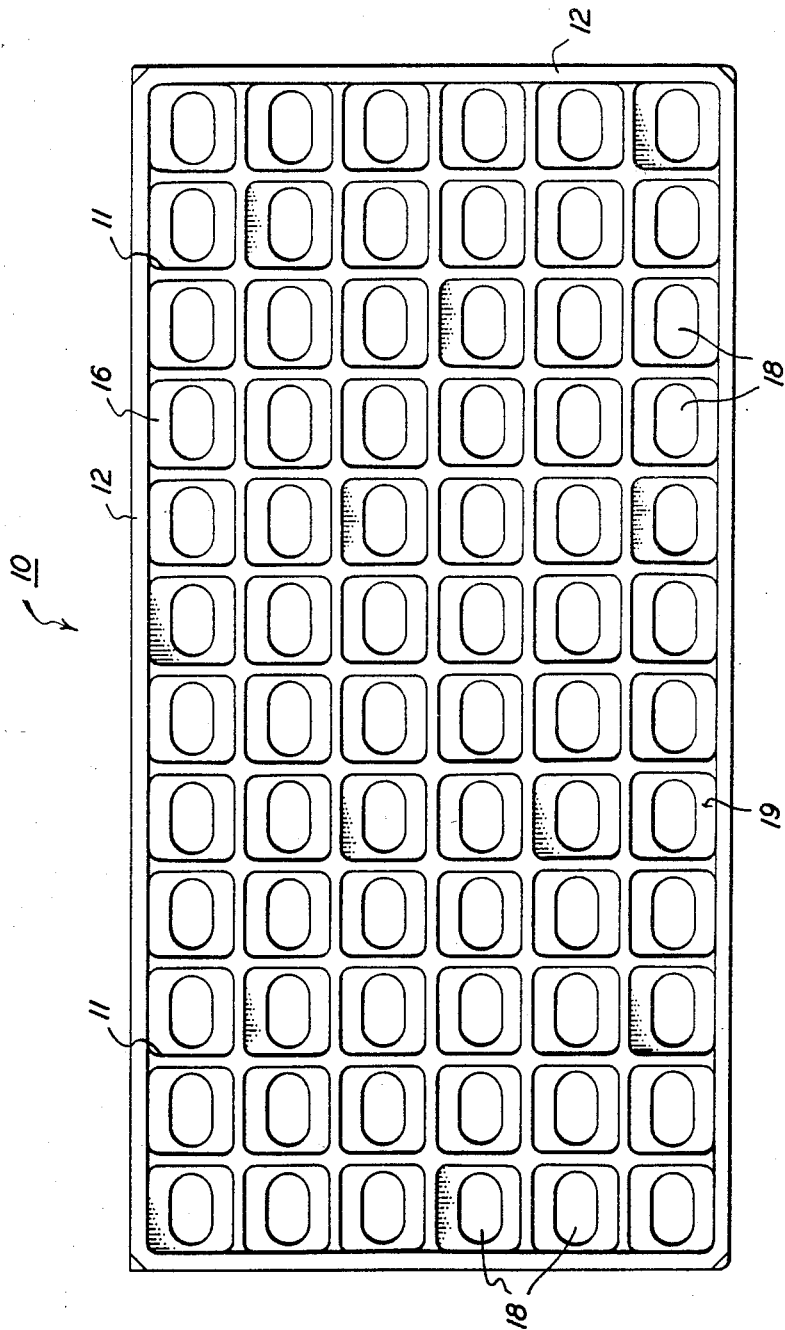
FIG. 3 is a top plan view of the rack of FIG. 2.

As shown in FIG. 2, the rack includes a top tier 12, an intermediate tier 14, and a bottom tier 16, selectively interconnected in spaced-apart, superposed relation. For holding test tubes or similar articles, the top tier 12 and intermediate tier 14 have apertures 11 and 13, respectively. These apertures are shaded, dimensioned, arrayed, and spaced according to the type, shape, and dimensions of the particular articles to be held by the rack. For holding test tubes, as preferred, especially when the tubes are to be used for a battery of related tests, it is desirable to employ a dense two-dimensional array of apertures as shown in FIGS. 2 and 3. As a result of the unique configuration of the intermediate tier 14, the provision of rectangular or square apertures is made possible, thus minimizing the thickness of the walls between adjacent apertures. When apertures 11 are square, as illustrated, the top tier 12 is a rectangular grid having the appearance of two groups of uniformly dimensioned and spaced parallel rods, which pass through each other at right angles.

Figures 5, 6:
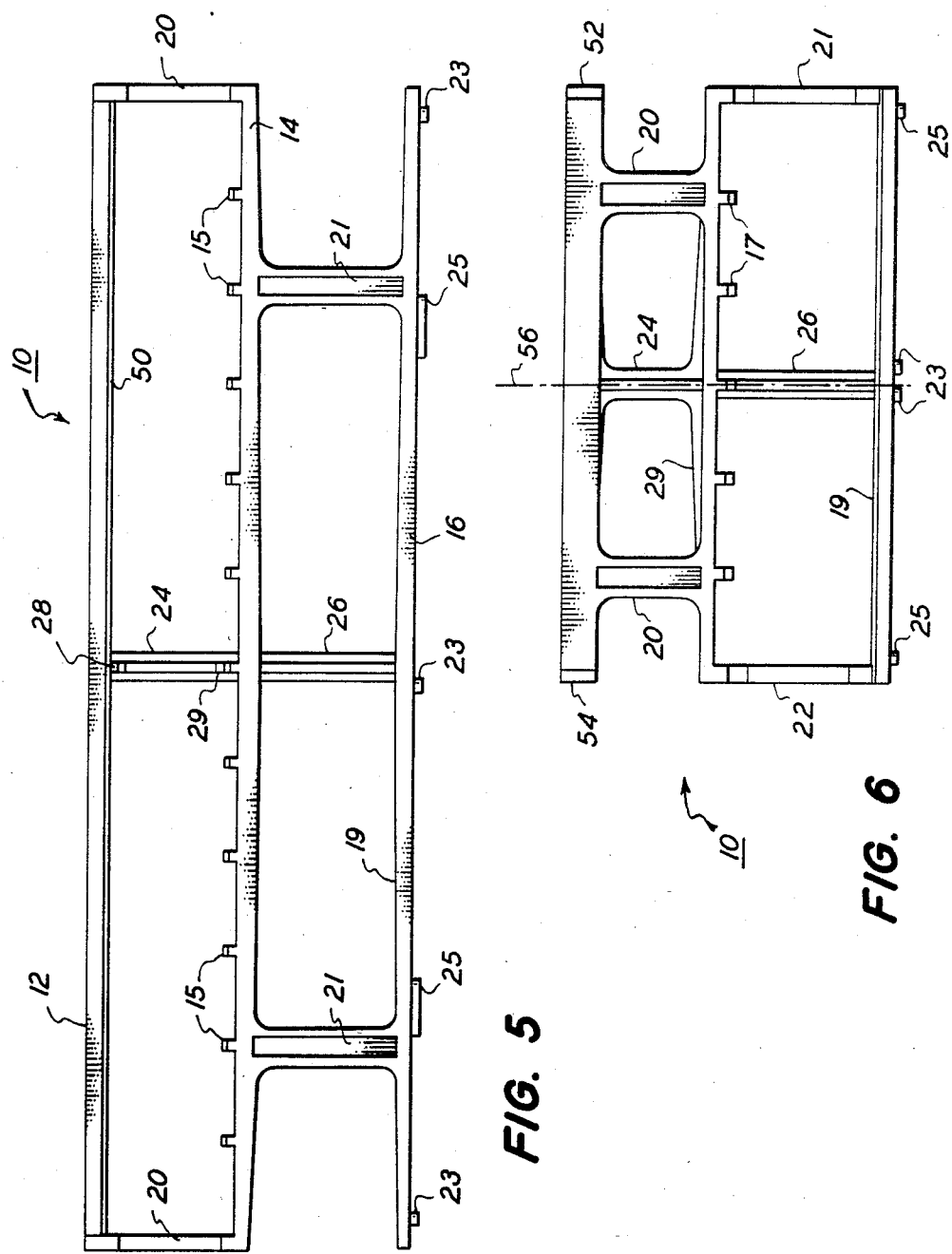
FIG. 5 is a front elevational view of the rack of FIG. 2.
FIG. 6 is a left side elevation view of the rack of FIG. 2.

As will be discussed more fully hereinafter, it is preferred that the segments of the mold that form the intermediate tier 14 also cooperate with additional mold segments to form the top tier 12. Generally, these mold segments are slides that, during the molding operation, occupy what will become the space between the top and intermediate tiers. When the molded rack has cooled, these slides must be withdrawn from this space (or the molded rack pulled from the slide). According to one form of the mold, a single slide is employed to form a top set of bars 15 of the intermediate tier 14. The upper surface of this slide is substantially planar and has a slight draft angle to facilitate its removal. When such a single slide is employed, it will be seen that the lower surface 50 of the upper tier will be substantially planar. It is preferred, however, that a pair of cooperating slides be utilized to form the top set of bars 15 of the intermediate tier and the lower surface 50 of the upper tier. Referring to FIG. 6, when the mold is closed, these two slides meet at a centrally located parting line 56. For ease of removal, a slight draft angle is provided on the upper surfaces of these two slides. When such slides are employed, the lower surface 50 of the top tier has two distinct planar surfaces that taper inwardly and downwardly toward the intermediate tier 14 from the front edge 52 and back edge 54, meeting, or intersecting, at the parting line 56. Although it is preferred that these front and rear portions of the upper surface 50 of the top tier slope downwardly and inwardly at an angle of about one-half to two degrees, if desired, the angle can be significantly larger. As will be discussed more fully hereinafter, although preferred, it is not essential that the parting line 56 be centrally located. However, whenever two or more slides are employed to form the lower surface 50 of the top tier, it is preferred that the formed front and rear portions of the surface 50 include angles that will facilitate withdrawal of the slides.

Referring once again to FIG. 2, the intermediate tier 14 is a lattice defined by intersecting sets of top bars 15 and bottom bars 17. The bars 15 and 17 are aligned, within their respective sets, along parallel axes that lie generally within the same horizontal plane. The two sets of bars intersect, preferably at right angles, to define rectangular, preferably square, apertures that precisely map the array of apertures 11 in the top tier, as illustrated by their hidden appearance when viewed from the top as shown in FIG. 3. It is preferred that the bars have a generally uniform, rectangular cross-sectional shape in order to provide generally planar surfaces which will permit easy, sliding withdrawal of the mold segments. It is to be understood, however, that the bars may be configured with other cross-sectional shapes such as, for example, substantially circular or semicircular, square, triangular, trapezoidal and the like. As with the apertures 11 in the top tier, the apertures 13 of the intermediate tier can be arranged, spaced, sized, and shaped differently to accommodate different test tubes or articles. For example, it may at times be desirable to form intermediate tier 14 in a fashion such that either alternate top bars 15 or bottom bars 17 are omitted in order to permit the storing of test tubes at an angle. The preferred symmetrical correspondence of the array of apertures 11 and the array of apertures 13 is generally preferred for test tubes in order to provide an orderly arranged, and visually uncluttered, assemblage of test tubes. To facilitate record keeping, the upper surfaces of the front, back, left side, and right side edges, which define the periphery of the top tier 12, may include alphanumeric inscriptions or labelling (not shown) adjacent the outer apertures to provide row-column matrix identification of the test tubes.

In keeping with an objective of simplifying the design of the mold parts, it is preferred that the upper surfaces of the bottom bars 17 and the lower surfaces of the top bars 15 lie generally within the same horizontal plane. As will be explained more fully hereinafter, but which can be briefly understood by viewing FIG. 1, the planarity of these surfaces permits sliding, uniaxial movement of the mold components that form the top bars 15 and bottom bars 17 of the intermediate tier. When more than a single mold component is used to form the bars, it may be desirable to have the upper surfaces of the bottom bars 17 and the lower surfaces of the top bars 15 lie other than within the same plane.

Referring again to FIG. 2, the bottom tier 16 also includes an array of apertures 18 that are aligned operatively, in selective fashion, with the apertures 11 and 13 in the top and intermediate tier, respectively. By "operatively aligned" or "aligned operatively", it is meant that selected apertures in a given tier are positioned in relation to selected apertures in another tier (or in other tiers) to hold test tubes or other articles in one or more predetermined positions. The apertures 18 are here shaped with rounded ends to provide receptacles for the rounded ends of test tubes. Inclusion of apertures or receptacles in the bottom tier is not essential, but is preferred to provide a more positive hold on the test tubes.

In similar fashion to the lower surface 50 of the top tier 12, the bottom tier 16 has an upper surface 19 that may take one of several forms. For example, this surface may be substantially planar, sloping slightly toward one or the other of its ends or may have substantially planar left and right side portions that angle inwardly from the left and right side edges, respectively, and upwards toward the intermediate tier, intersecting at a parting line. This parting line may be located centrally or positioned toward the left or right side edge of the bottom tier.

The top tier is connected to the intermediate tier by side supports 20. In the FIGS. 2 through 4 embodiment, two side supports 20 are included on the left and right sides of the rack (left being the closest, exposed side in FIG. 2). A single side support (as shown in FIG. 1) or two or more side supports may be utilized. The two-support arrangement of FIG. 2 provides sufficient rigidity to the ends of the rack while permitting observation of the tubes from the ends. Optionally, the space between supports 20 may partially be filled with a tab (either depending from the top tier or extending from the intermediate tier). Such a tab would be used to bear legends indicating, for example, hazardous contents in the test tubes or the manufacturer's identification.

Although preferred, it is not essential that the top and intermediate tiers be connected at their left and right side edges. Thus, for example, interconnection of these tiers could be accomplished by one or more supports positioned inwardly from either or both of the left and right side edges of the tiers. Thus, in simplest form, the top and intermediate tiers may be interconnected by a single support that can be located at aligned edges of the two tiers, inwardly of the edges of both tiers, or extending from the edge of one tier to a position inward of the edges of the other tier. As will be discussed more fully hereinafter, it is not essential that the three tiers have substantially the same peripheral shape and dimensions or that the edges of the tiers be aligned substantially coplanar. In such instances, the side supports 20 (whether located at the edges or inward therefrom) may have a configuration and alignment other than as shown in FIG. 2. For example, if the left side edge of the intermediate tier were extended outward relative to the left side edge of the top tier, the side supports 20 could either slope smoothly downward and outward or follow a sharp S-curve downward and outward from the top to the intermediate tier.

It will, thus, be seen that a wide variety of means may be provided for interconnecting the top and intermediate tiers. Again, in keeping with the goal of simplifying the design of the mold, it is preferred that the side supports 20 be arranged so that they may easily be formed by the side surfaces of the slide (or slides) that form the top bars 15 of the intermediate tier. Since these slides are withdrawn along an axis that is aligned parallel to the axes of the top bars 15, it is preferred that the side supports 20 have their inner surfaces aligned parallel with the axes of the top bars 15 so that the slides may also be easily withdrawn along these inner surfaces. In similar fashion to the formation of the lower surface 50 of the top tier and the upper surface 19 of the bottom tier, the inner surfaces of the side supports may have either substantially planar inner surfaces or substantially planar front and rear surface portions that intersect at a parting line. Where the side supports 20 are located inwardly of the edges, it may be desirable that both the inner and outer surfaces thereof be aligned with the axial path of movement of the slides that form them. In all such arrangements that utilize the slides forming the bars 15 to also form the side supports 20, it is essential only that the supports be formed without undercuts.

The intermediate tier is connected to the bottom tier by two front supports 21 and two rear supports 22, only one of which is shown in FIG. 2. Although not essential, the front and rear supports (and the side supports 20) may include vertical ribs for added strength and radiused, or beveled, corners for internal strain relief. In the preferred configuration of FIG. 2, the front supports 21 and rear supports 22 connect the front and rear edges, respectively, of the intermediate and bottom tiers. The outer edges of both pairs of supports are aligned substantially coplanar with the edges of the tiers that they connect. It will be appreciated from the preceding discussion of the side supports 20 that the front supports 21 and rear supports 22 may have a wide range of configurations. Thus, there may be one or more supports at the front or rear edges, one or more supports located inward of the front and rear edges of the bottom and intermediate tiers, or a combination of supports at the edges and inward of the edges. Since it is preferred that the slide or slides that form the bottom bars 17 also help to form the front and rear supports 21 and 22, it is also preferred that the inner surfaces of the supports 21 and 22 be aligned with the axial path of movement of the slides. As shown in FIG. 6, in the preferred rack, the inner surfaces of the supports 21 and 22 have substantially planar inner surfaces that are aligned substantially parallel to the axes of the bottom bars 17.

Figure 11:
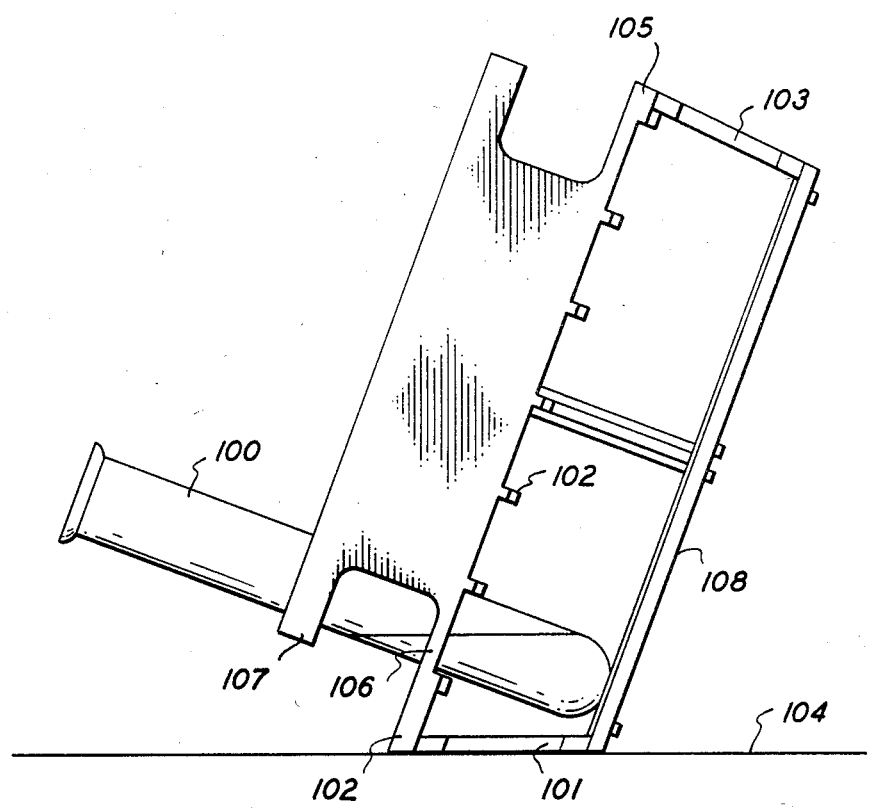
FIG. 11 is a right side elevation view of an alternate slant rack embodiment of the invention, showing a held test tube and contents.

Referring to FIG. 11, there is shown one example of a modified rack in which the front support 101 has an inner surface that is not aligned parallel to the bottom bars 102, but is aligned with the axis of the slide, (which slide is operatively withdrawn outward toward the viewer). In this modified form, the rack is used as a slant rack for holding test tubes and their contents at a predetermined angle (one such tube 100 and its contents are shown). As illustrated, the modified intermediate tier 106 extends outward relative to the top tier 107 and bottom tier 108 (both of which are substantially unmodified). Either the entire front edge of the intermediate tier 106 or a portion thereof (for example, a post) may form the outward extension. In either of these arrangements, it is preferred that the support 101 extend from the front edge of the bottom tier 108 at an angle outward to the extension 102 of the intermediate tier 106. In this preferred construction, the front surface of the support 101 provides a stable surface for supporting the rack when tilted onto a table or other surface 104, as shown in FIG. 11. The invention is particularly well suited to providing a range of slant angles, the approximately 20-degree angle illustrated in FIG. 11 being one such example. A close examination of FIG. 11 reveals that the intermediate tier 106 also has a rear extension 105 that projects outward from the bottom and top tiers. The rear support 103, which connects the extension 105 to the rear edge of the bottom tier 108, is inclined at an angle of about five degrees. Thus, when the rack is tilted onto the outer surface of the rear support 103, the test tubes and their contents are oriented at about five degrees. Again, it is preferred, but not necessary, that the support 103 extend between the outside edges of the extension 105 and bottom tier 16. For example, either support 103 or support 101 could alternately extend at right angles relative to the intermediate and bottom tiers.

As suggested by the modified rack of FIG. 11, the invention is well suited to provide multitier racks having a variety of configurations. The arrangement of the top and bottom sets of bars advantageously permits the placement of interconnecting supports at various locations along and within the edges of the tiers. Although the invention has been described in relation to a three-tiered structure, which structure has substantially parallel tiers having the same general rectangular periphery and having edges that are aligned substantially coplanar, the invention encompasses a broad range of shapes, dimensions, and alignment of the tiers. Although the arrangement of the preferred rack of FIGS. 1 through 6 is particularly helpful in simplifying the design of the mold that forms it, it may be desirable to absorb the added cost of a more complex mold in order to configure the rack other than as illustrated. For example, it may be desirable to extend one or more of the edges (or only a portion thereof) of one or more of the tiers. In such instance, the edges of the tier, or tiers, so extended would have other than a coplanar alignment with the edges of the other tiers. By way of an additional example, it is also not necessary that the tiers be generally parallel, or horizontal. Thus, any of the tiers, including the intermediate, may be arranged at an angle relative to either of the other tiers.

Although the invention has been described in relation to the preferred rack and in terms of the arbitrary directional convention adopted therefor, it is to be understood that the inventive concepts and the appended claims broadly cover a rack having a plurality of spaced-apart, selectively interconnected tiers, at least one intermediate tier of which has a top set of bars and a bottom set of bars. Importantly, it is not essential that the bars within each set be parallel to one another or that such bars extend the full distance between edges of the intermediate tier. Thus, for example, either or both of the top and bottom sets of bars may consist of groups of bars, the bars within each group being substantially parallel to one another. Although the configuration of the intermediate tier with such groups of parallel bars would complicate mold design, it would provide a greater variety of configurations for the apertures within a given rack and, hence, provide a means for holding or grouping of test tubes or other articles having divergent shapes. Since the individual bars within a given group wihin the top set of bars would not necessarily overlap each of the bars within the bottom set (or groups of bars within the bottom set), there would be only selective intersection and superposition of the various bars. That is to say, only selected bars within the top set would be superposed over and intersect with selected bars within the bottom set to define the apertures.

An important aspect of any such arrangement is that the bars making up the lattice of the intermediate tier contain no undercuts. In the context of this disclosure, undercuts mean protrusions that will prevent the withdrawal of the mold segments that form the components of the rack. Although the invention is intended to encompass any single-piece injection molded rack, the intermediate tier of which has selectively superposed and intersecting top and bottom sets of bars, it is preferred that there be no undercuts in the lattice of the intermediate tier in order to enable the formation thereof with slides, which move uniaxially.

As shown most clearly in FIGS. 5 and 6, further strengthening of the rack is obtained by including an upper spacer or column 24 extending between the top and intermediate tier and a lower spacer 26 extending between the intermediate tier and the bottom tier. While the spacers 24 and 26 may have a variety of cross-sectional shapes, such as circular, square, triangular, or even a long thin rectangular plate, which would give the appearance of a wall, the illustrated spacers resemble a cross in cross section and, accordingly, exhibit good rigidifying strength. For added structural strength, the top tier optionally includes a gusset 28 that depends from the lower surface 50 and extends frontward and rearward from the spacer 24, spanning a portion of the front to rear dimension of the surface 50. While only one centrally located gusset 28 is shown in FIG. 5, it may be desirable to include more than one such gusset at spaced intervals along the lower surface of the top tier. As illustrated in FIG. 2, a gusset 29 may also be optionally provided, upstanding from one or more of the top bars 15. When so provided, the gusset 29 as well as the central gusset 28 may be formed as outward extensions of the upper spacer 24.

Figure 4:
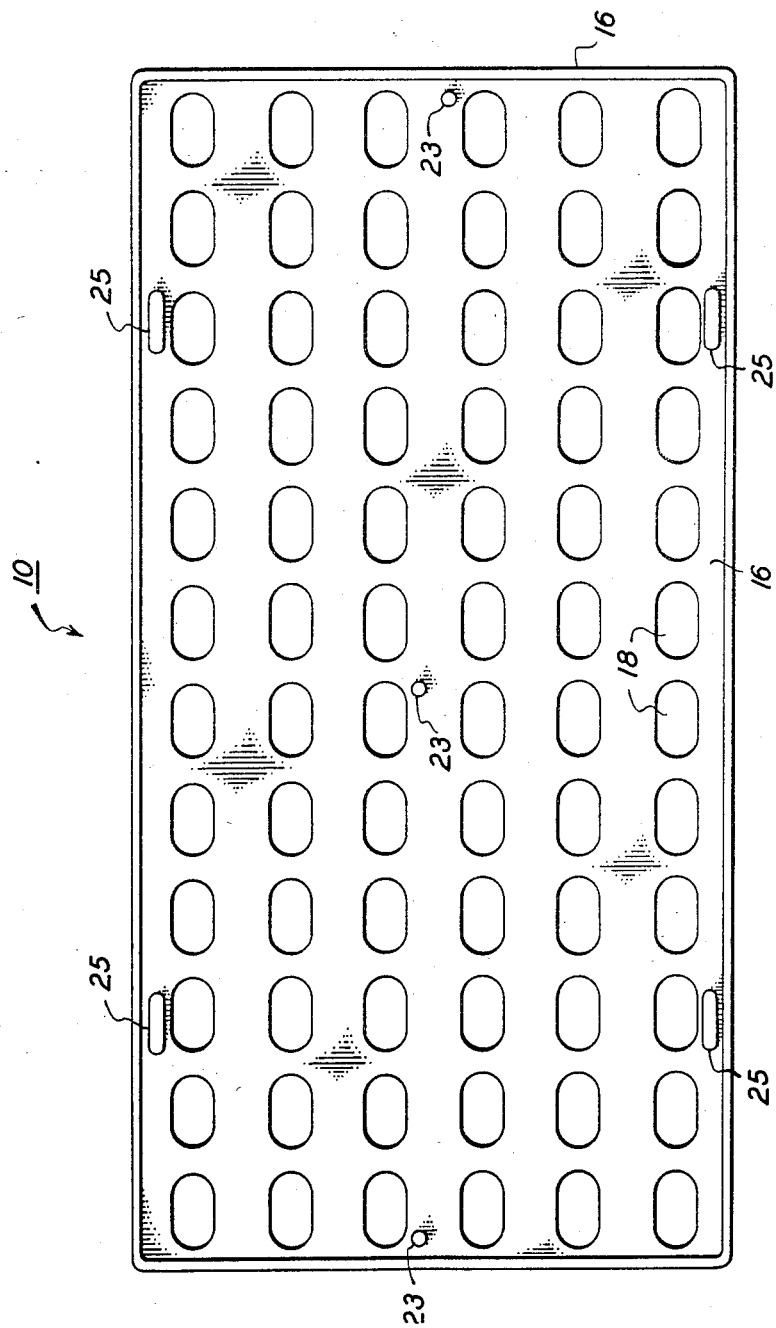
FIG. 4 is a bottom plan view of the rack of FIG. 2.

As shown in FIG. 4, posts 23 and elongated feet 25 may optionally be included on the lower surface of the bottom tier 16. In addition to elevating the rack, the posts and spacers may be advantageously shaped and positioned to provide an interlocking fit with the apertures 11 in the top tier of another rack for stacking purposes.

The rack in accordance with the invention can be made from any suitable injection molding material, such as, for example, polyethylene, polypropylene, polystyrene, high-impact polystyrene, polycarbonate, polyamides, polyacetals, polyurethane, and the like. The injection molding material can also contain fillers, glass fibers, carbon black, carbon fibers, boron fibers, silica, titanium dioxide, and the like. Glass fibers are a preferred filling material.

Figure 7:
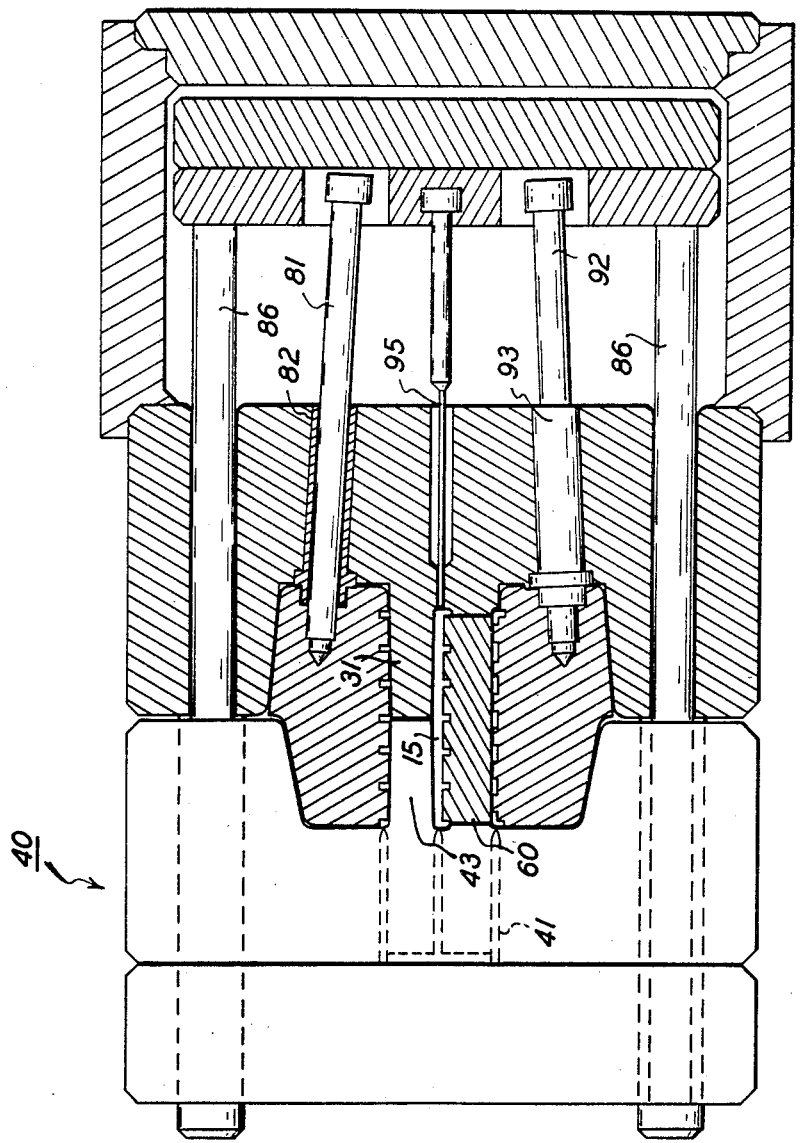
FIG. 7 is a partial cross-sectional side elevation view of the preferred mold in the closed position showing the molded rack.
Figure 8:
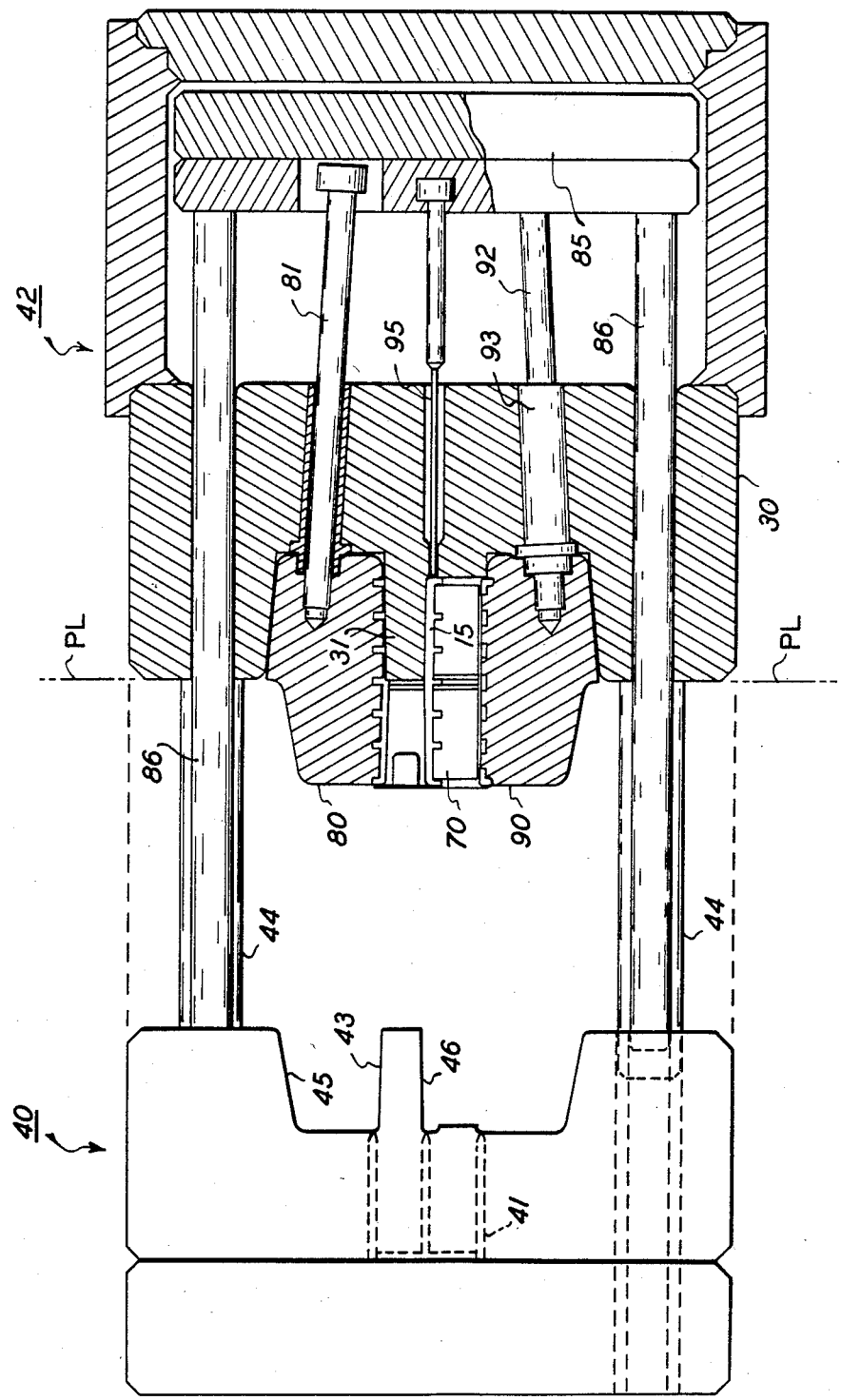
FIG. 8 is a view similar to the view of FIG. 7, but showing the mold in the open position.
Figure 9:
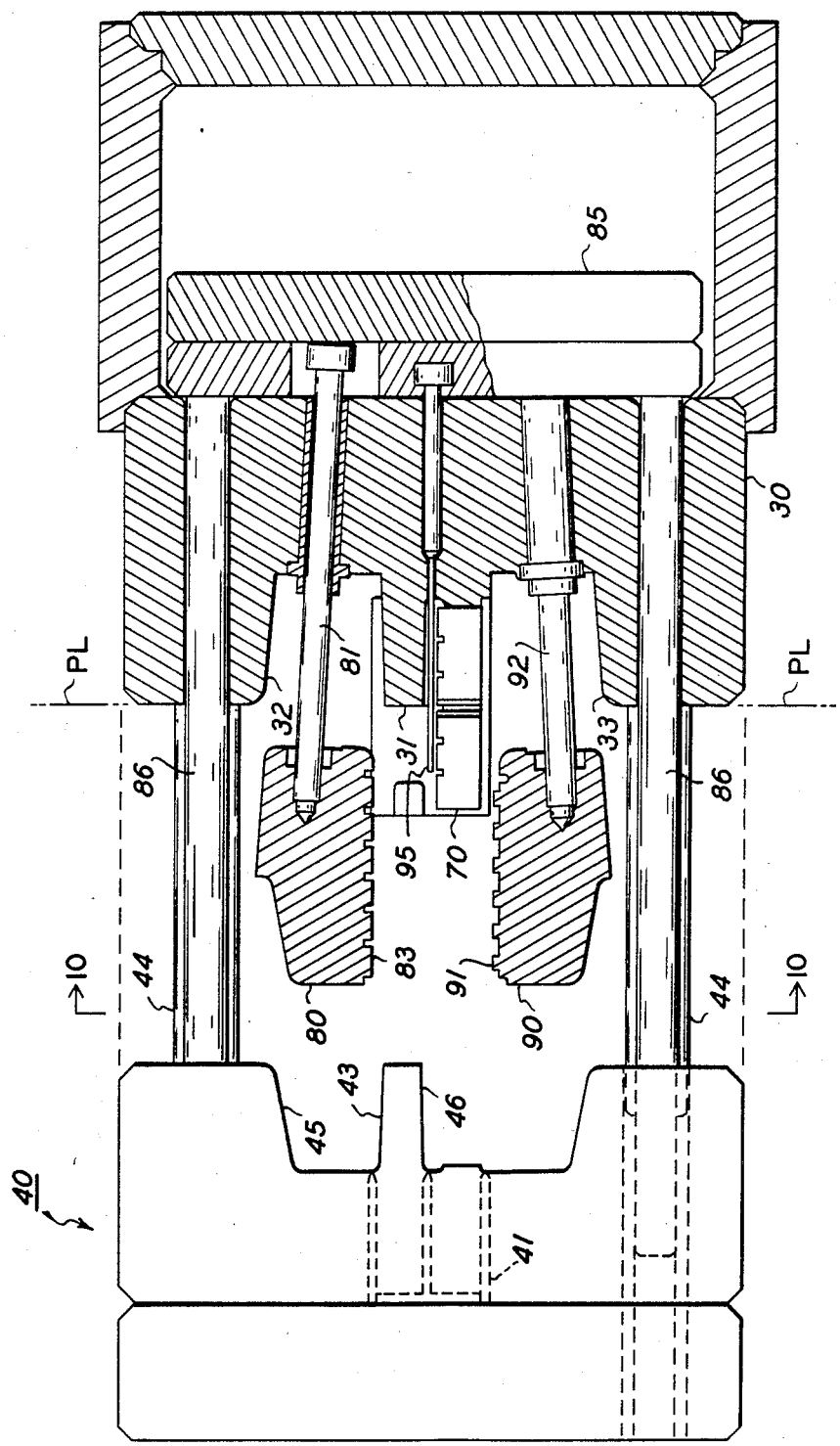
FIG. 9 is a view similar to that of FIGS. 7 and 8, but showing the mold in the full ejection position, with the rack ejected.

FIGS. 7, 8, and 9 illustrate, in partial cross-sectional side elevation, the mold components and the sequential operation thereof to produce the inventive rack. As noted earlier, FIG. 1 diagrammatically illustrates the movement and relationship of these components and will be referred to to facilitate an understanding of the more detailed views of FIGS. 7 through 9. As an aid in understanding this mold, certain features of the mold have been simplified or not shown. As well, for purposes of clarity, some sectional portions of the mold (and the molded rack in FIGS. 7 and 8) have not been cross-hatched. Also, since the gating methods and techniques for introducing the molten plastic material into the mold are conventional, they are not shown or described in detail herein. Preferably, a three-plate runner mold system is employed, although other systems may be used. As well, the mold may be readily adapted for use in a wide variety of injection molding machines that operate in either a vertical or horizontal manner and with any suitable injection moldable material. The FIGS. 7 through 9 illustrate the preferred disposition of the mold in a horizontal-type injection molding machine.

Referring initially to FIG. 8, the mold includes a stationary, or injection, half generally designated 40 and a movable, or ejection, half 42. The ejection half 42 is movable along an axial path determined by four parallel leader pins 44 that are slidably journalled in bores located adjacent the corners of the mold. Movement of the ejection half along the leader pins between the mold open position of FIG. 8 and the mold closed position of FIG. 7 is controlled by means of a conventional hydraulic apparatus that is not shown. The distance travelled by the ejection half 42 is somewhat foreshortened in the FIGURES, but is preferred to be about two to two-and-one-half times the dimension of the molded rack to facilitate ejection thereof.

Injection half 40 includes a runner system 41 through which plastic material is introduced into each of the portions of the mold cavity that form the three tiers. A rear slide 43 projects outwardly from a cavity 45 of the injection half. The lower surface 46 of the rear slide is substantially planar and aligned generally parallel to the axial path of movement of the ejection half 42. As shown in FIG. 1, channels 47 are milled into the lower surface 46 of the rear slide. These channels 47 correspond in cross-sectional dimension to the cross-sectional dimension of the top bars 15 of the rack and in length to a predetermined portion of the overall length of the top bars. The channels 47, i.e., the longitudinal axes thereof, are aligned parallel to the axial path of movement of the ejection mold half 42. This alignment is illustrated in FIG. 1 where the path of movement of the ejection half is in the direction of the arrow extending from rear slide 43 into the space between the top and intermediate tiers of the rack 10. It is to be understood that this arrow, as well as the other arrows in FIG. 1, illustrate the relative (not necessarily actual) movement between the rack and the parts of the mold which form it. For example, during the mold-opening operation, the rear slide 43 (as part of the injection mold half) remains stationary while the ejection half (and the still captive molded rack) are moved in the direction of the arrow just discussed. The remaining components in FIG. 1, which will be identified and described in detail hereinafter, are part of the ejection half 42 of the mold. Briefly, these elements are front slide 31, left core slide 60, right core slide 70, upper slide block 80, and lower slide block 90.

As seen best in FIG. 9, front slide 31 is formed as part of retainer block 30 and is flanked by an upper cavity 32 and a lower cavity 33. In the mold closed position, the front slide 31 cooperatively engages rear slide 43 in face-to-face relation to define the portion of the mold cavity that forms the top bars 15 of the intermediate tier. To form this portion of the cavity, the lower surface 34 of the front slide 31 (see FIG. 10) includes parallel channels 35 that, in identical fashion to the channels 47 of the rear slide 43, correspond in cross-sectional dimensions to the cross-sectional dimensions of the top bars 15. When the front and rear slides are engaged in the mold closed position, the channels 35 in the front slide mate end to end with the channels 47 of the rear slide to form channels that correspond in length to the desired length of the top bars. While the bar length-determining function may be apportioned between the front and rear slides, as discussed below, it is preferred that each of these slides forms half of the top set of bars. Similarly, the longitudinal axes of the channels 35 are parallel to one another and to the axial path of movement of the ejection half 42 of the mold. The axes of the channels 35 lie within a plane that is substantially parallel to the plane of lower surface 34. As suggested in FIG. 1, it is preferred that the front slide 31 and rear slide 43 be mirror images of one another and engage along a parting line that runs centrally through the cavity that forms the rack (which corresponds with the parting line 56 on the rack, as shown in FIGS. 5 and 6). This parting line is coincident with the parting line between the retainer block 30 and the injection half 40, and is indicated by the line labelled PL in FIGS. 8 and 9. It is to be understood that the front and rear slides may be arranged to engage along a parting line that is not centrally located and that is oriented in a plane that lies other than generally perpendicular to the direction of movement of the ejection half. For example, the mating faces of the front and rear slides may be oriented in planes that are parallel to one another but at an angle relative to the path of movement of the ejection half. In such instance, adjacent channels on each slide would gradually increase in length from a shortest channel to a longest channel. When the two slides are engaged, the shortest channel of one slide would mate with the longest channel of the other slide in progressive fashion. Alternately, the engaging faces of these slides could be inclined toward one another so that the upper surfaces engaging at a parting line that is offset (either to the front or to the rear) from the parting line of the lower surfaces.

As mentioned above, in preferred form, the front and rear slides each form half of the cavity corresponding to the top set of bars 15. Advantageously, the central engagement of the front and rear slides permits the inclusion of vertical channels 48 and 36 that cooperatively form the portion of the mold cavity corresponding to the upper spacer 24 of the rack.

The upper surface 49 of the rear slide and the upper surface 37 of the front slide are each substantially planar and cooperate with the upper slide block 80 to form the portion of the mold cavity corresponding to the top tier 12 of the rack. To facilitate separation of the molded rack from the front and rear slides, the surfaces 49 and 37 preferably include a draft angle that tapers inwardly and downwardly toward the parting line, i.e., toward the respective engaging faces of the rear and front slides. The draft angles are preferably slight, from about 0.5 to two degrees in order to provide a generally planar appearance to the lower surface 50 of the top tier. In actuality, however, the presence of these draft angles molds distinct planar front and rear portions of the lower surface of the top tier. If desired, of course, a much larger draft angle could be utilized.

To form the gusset 28 on the underside of the top tier, the upper surface 37 of the front slide and the upper surface 49 of the rear slide contain milled grooves, as shown in FIG. 1, which dimensionally correspond to the desired dimensions of the gusset. If more than one gusset is desired, additional channels may be provided on these two surfaces. In similar fashion to the channels that form the top bars 15, the channels that form such gussets are aligned parallel to the axial path of movement of the ejection mold half so that the front and rear slides may be slidingly separated from the molded gussets.

It will be appreciated that, rather than the single vertical channels 36 and 48, the front slide 31 and rear slide 43 could optionally include on their engaging faces plural channels to form multiple upper spacers or, if desired, a single solid support that spans the entire length of the top and intermediate tiers. Various forms of providing such alternate spacers and including rigidifying and stress-relieving features therefor will be appreciated to those skilled in the art. It will be further appreciated that, rather than the symmetrical arrangement of the front slide 31 and rear slide 43, a single slide could be used to form the top bars 15. Such a slide would include channels that span the entire front-to-rear length of the upper bars 15. Employment of such a slide, would, however, not permit the formation of centrally located spacers between the top and intermediate tiers.

Figure 10:
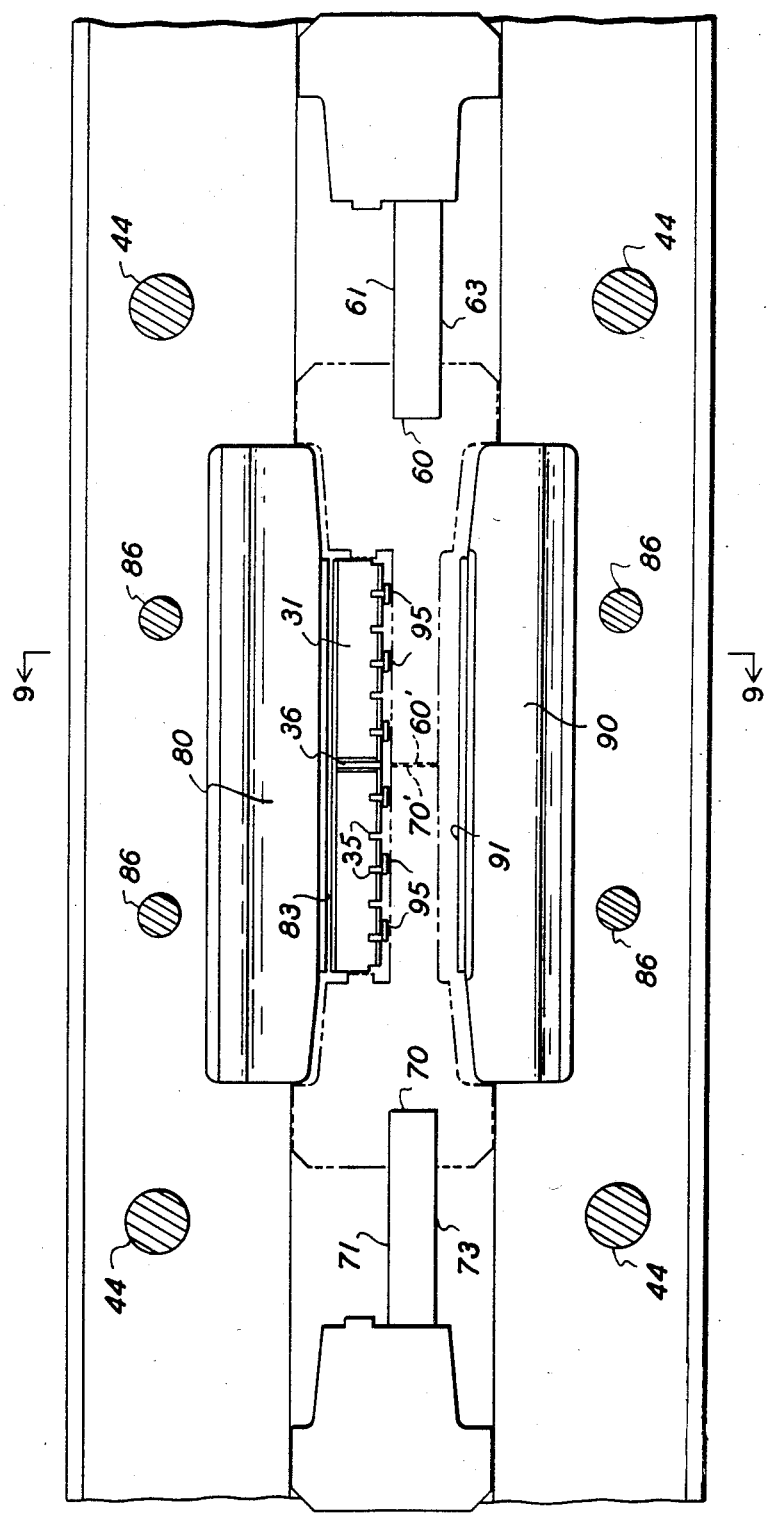
FIG. 10 is a cross-sectional front elevation of a portion of the mold taken along line 10—10 of FIG. 9 and illustrating in broken line the position of the core slides when the mold is closed.

The left core slide 60 and right core slide 70 cooperate in similar fashion to the front and rear slides to help form the bottom bars 17 of the intermediate tier. As seen most clearly in FIG. 1, the upper surfaces 61 and 71 of the left and right core slides, respectively, include parallel channels 62 and 72, respectively, which mate end-to-end to define the portion of the mold cavity corresponding to the bottom bars. These channels correspond in cross-sectional dimension to the cross-sectional dimension of the bottom bars and in length to predetermined portions of the overall length of the bars. To permit separation of these slides from the molded rack, the channels are arranged with their longitudinal axes parallel to the axial paths of movement of the core slides 60 and 70. Preferably, the core slides are movable along coaxial paths in opposed directions relative to one another and at right angles to the axial path of movement of the ejection half. If it is desired to form a rack having top and bottom sets of bars which intersect at other than right angles, then the axial paths of movement of the core slides would be oriented at some other angle relative to the axial path of movement of the ejection half. As shown in FIG. 10, the core slides 60 and 70 move from their respective closed positions 60′ and 70′ shown in connected broken line, to their open positions shown in solid line, in which these slides are fully away from the molded rack (not shown in FIG. 10). In viewing FIG. 10, in relation to FIGS. 7, 8, and 9, it is helpful to note that, because of the direction of view and the arbitraily adopted directional convention, the right core slide 70 appears on the viewer's left in FIG. 10, while the left core slide 60 appears on the viewer's right. Also, in the mold closed position of FIG. 7, the section is taken through the left core slide 60, while, in FIGS. 8 and 9, the left core slide 60 has been removed from view by virtue of the section (line 9—9 in FIG. 10). Since the right core slide 70 has been withdrawn in FIGS. 8 and 9, the viewer is looking at the face of this slide in these figures (a portion of this face being hidden by the yet to be ejected rack in FIG. 8).

Again, in analogous fashion to the provision of substantially planar upper surfaces on the front and rear slides, the lower surfaces of the left and right core slides are each substantially planar but not necessarily coplanar with one another. To permit separation of the core slides from the molded rack, a slight draft angle is also preferably provided for the lower surfaces 63 and 73. Thus, the surfaces 63 and 73 each taper inwardly and upwardly toward the parting line of the left and right core slides.

From FIG. 1 it will be seen that these lower surfaces 63 and 73 cooperate with the lower slide block 90 to form the bottom tier 16, the apertures therein being formed by the projecting pin cores 91. The upper surface 19 of the bottom tier formed by the lower surfaces 63 and 73 has distinct, substantially planar, left and right portions which intersect at the centrally located parting line. When the preferred draft angle of from about 0.5 to 2 degrees is used, the slight deviation of the molded surface 19 from a true plane is discernible only upon close visual inspection. Of course, if desired larger draft angles may be used. Rather than the pair of cooperating core slides 63 and 73, a single slide may be employed to form the bottom bars of the intermediate tier and the upper surface of the bottom tier. The lower surface of such a single slide would also include a draft angle to permit facile separation from the upper surface of the bottom tier.

To form the preferred, centrally located lower spacer 26 of the rack, the engaging faces of the left and right core slides include vertical channels 64 and 74, respectively, which mate in the mold closed position. Rather than the single vertical channels 64 and 74, the left and right core slides could optionally include on their engaging faces plural channels to form multiple lower spacers or, if desired, a single solid, wall-like support that spans the entire front-to-back width of the intermediate and bottom tiers. It will be appreciated by those skilled in the art that the number, configuration, and positioning of these spacer-forming channels may be varied greatly. In the preferred rack, the bottom tier has sufficient rigidity so that additional gussets are not needed. It will be understood, however, that it may be desirable with a less rigid configuration of the bottom tier to include gussets on the upper surface 19 of the bottom tier. In similar fashion to the formation of the gusset 48, such gussets for the bottom tier may be formed by suitably milling channels into the lower surfaces 63 and 73 of the core slides, either as extension of the channels 64 and 74 or as separate channels. As with the front and rear slides, the left and right core slides may have unequal lengths so that their respective channels form unequal lengthwise portions of the bottom bars. As well, the engaging faces of the core slides may meet in a plane that is inclined at an angle relative to the coaxial paths of movement of these two slides. Additionally, the engaging faces of these two slides may be inclined toward one another so that the upper surfaces 61 and 71 engage at a parting line that is offset (either to the left or to the right) from the parting line of the lower surfaces 63 and 73. A similar arrangement may, of course, be employed for the front and rear slides 31 and 43. To form the side supports 20 between the top and intermediate tiers, the left and right core slides include vertical surface portions 65 and 75, respectively, which have milled side channels 66 and 76, respectively, as shown best in FIG. 1. When the mold is closed, the right side channel 76 cooperates with the right side surface portions of the front and rear slides, 31 and 43, respectively, to form the portion of the mold cavity corresponding to the right side support. Similarly, the left side channel 66 cooperates when the mold is closed with the left side surface portions of the front and rear slides to form the portion of the mold cavity corresponding to the left side support of the rack. It will be recalled that the FIG. 1 embodiment of the rack illustrates a single side support for purposes of clarity in this FIGURE. For the preferred mold, which yields the rack of FIG. 2, the surfaces 65 and 75 would have a pair of channels corresponding to the two side supports 20 on each of the left and right sides of the rack. It can be seen that a wide variety of configurations for the side support may be realized by altering the vertical surfaces 75 and 65 of the two core slides. As well, the location of such side supports may be positioned inwardly from the side edges by altering the surfaces 65 and 75 of the core slides and the respective side surfaces of the front and rear slides with which they engage. For example, by providing a projection from the surface 75, and by suitably altering the right side surfaces of the front and rear slides, the right side support may be moved inward from the right side edges of the top and intermediate tier. By arranging the surfaces 65 and 75 at an angle other than the generally vertical angle suggested in FIG. 1, the side edges of the intermediate tier may be moved outward relative to the side edges of the top tier. Such a reconfiguration would, of course, also incline the side supports at an angle. One skilled in the art will appreciate that many such modifications may be made, subject only to the general requisite that undercuts on the inner surfaces of the left and right side supports be avoided in order to permit withdrawal of the front and rear slides 31 and 43.

The front and rear supports 21 and 22, respectively, are formed in an analogous fashion by channels which are formed in vertical surface portions 39 and 69, respectively, of the rear and front slides, 43 and 31, respectively. Only one channel 38 on the rear slide is clearly seen in FIG. 1, it being appreciated that there is a pair of channels in this surface, as well as a pair of channels in the surface portion 69 of the front support. In identical fashion to the surfaces of the left and right core slides that form the side supports, the vertical surface portions of the front and rear slides that contain the channels may be variously configured to provide a wide variety of front and rear supports. For the illustrated preferred arrangement, and for all such modifications, the vertical surface portion 39 of the rear slide, which contains the channel 38, cooperates when the mold is closed with rear surface portions of the left and right core slides 60 and 70, while the vertical surface portion 69 of the front slide 31, which contains the channels (which are not seen) cooperates when the mold is closed with front surface portions of the left and right core slides. It will be seen that one such modification would provide a mold for forming the modified rack of FIG. 11. Although not illustrated in FIG. 1, it will be understood that the channels which form the front and rear supports are preferably configured to yield the front and rear supports illustrated in FIG. 2.

Referring to FIGS. 7 and 8, the upper slide block 80 and lower slide block 90 are releasably held within the upper cavity 32 and lower cavity 33, respectively, of the retainer block 30. These slide blocks remain seated in the retainer block while the ejector half moves from the mold closed position of FIG. 7 to the mold open position of FIG. 8. To permit separation of the upper and lower slide blocks from the molded rack 10 (see FIG. 8), the upper slide block 80 and lower slide block 90 are movable relative to the retainer block 30 along paths determined by upper angular ejector pin 81 and lower angular ejector pin 92, respectively. Both upper and lower angular ejector pins are slidably journalled in respective bores that are disposed at an angle with respect to the axial path of movement of the ejection mold half. Journalling of the angular ejector pins is accomplished with upper boss 82 and lower boss 93. The angular ejector pins 81 and 92 are secured at their forward ends within upper slide block 80 and lower slide block 90, respectively. At their rearmost ends, the angular ejector pins are conventionally secured in T bushings to permit vertical travel of the ends when the ejector pins are driven forward through the angular path in the retainer block 30. The sequence of movement of the angular ejector pins 81 and 92 is shown in FIGS. 8 and 9. From the mold open position of FIG. 8, the angular ejector pins 81 and 92 are driven forward by the forward travel of the ejector box 85, which travels along a path determined by leader pins 86 (preferably four, as shown in FIG. 10). This technique for ejecting angular pins and the construction of ejector box 85 are conventional and, accordingly, will not be described in detail herein.

Upon completion of the travel of the angular ejector pins 81 and 92, the upper slide block 80 and lower slide block 90 are displaced away from one another and away from the molded rack. In reaching this fully open, or ejection, position, the two slide blocks 80 and 90 follow the angular path defined by the bores through retainer block 30. This action withdraws the projecting pin cores 91 from the apertures formed in the bottom tier of the rack and also pulls the projecting pin cores 83 from the apertures formed on the top tier of the rack. As will be seen most clearly in FIG. 1, the projecting pin cores 83 on the upper slide block cooperate with the upper surfaces 37 and 49 of the front and rear slides, 31 and 43, respectively, to define the portion of the mold cavity corresponding to the upper tier. Similarly, the projecting pin cores 91 on the lower slide block 90 cooperate with the lower surfaces 63 and 73 of the left core slides, 60 and 70, respectively, to define that portion of the mold cavity corresponding to the bottom tier of the rack.

To strip the molded rack from its engagement with the front slide 31, plural ejector blades 95 are slidably journalled in retainer block 30 in conventional fashion, the ejector blades 95 are activated by the ejector box 85 simultaneously with the angular ejection of the upper and lower slide blocks. The ejector blades 95 engage the molded rack at points spaced along the front edge of the intermediate tier. In FIG. 9, it must be observed again that the face of the right core slide 70, which is visible and appears to be disposed beneath ejector blade 95, is, in fact, displaced backward from the plane of the FIGURE and, hence, completely away from the molded rack. This relative position is shown in FIG. 10. To obtain this action, the sequence of the mold opening and ejection is as follows. First, the mold is fully opened to the position shown in FIG. 8. Then the left core slide 60 and right core slide 70 are withdrawn by conventional hydraulic apparatus (not shown). Thereafter, the upper slide block 80 and lower slide block 90 are cammed off by the action of the angular ejector pins 81 and 92 and the molded rack is ejected by the action of the ejector blades 95, all of which are actuated simultaneously by the action of the ejector box 85.

Although the mold has been described in its preferred embodiment, for the formation of the preferred embodiment of the inventive three-tiered rack for holding test tubes, it is to be understood that the inventive concepts embrace a mold for forming a single-piece rack having more than three tiers. For example, the top tier of the rack illustrated in FIG. 1 could easily be formed as a second intermediate tier by first providing bottom bar-forming channels in the upper surfaces 49 and 37 of the rear and front slides. A top set of bars would then be formed over this bottom set of bars by stacking an additional core slide (or a pair of core slides) over the left and right core slides 60 and 70. To form the top bars on this second intermediate tier, this additional slide or slides would have channels milled in the lower surface or surfaces. The top tier above this intermediate tier could be formed, for example, by a cooperative arrangement similar to the cooperative action of the upper slide block 80 and the upper surfaces 37 and 49 of the front and rear slides.

It is also to be appreciated that the number of slides may be increased and oriented at various angles relative to one another and suitably channeled to provide a wide variety of configurations to the intermediate tier. Such additional slides, or even the illustrated slides, may also be modified to provide other than a rectangular periphery for one or more of the tiers. Such modifications may be particularly desirable where the mold is to be used to provide a rack that is to be used for purposes other than holding test tubes. For example, such modifications may be useful in packaging, storage, and shipping of various kinds of containers for liquids and the like. It is fully intended that the inventive concepts for both the rack and mold not be limited merely to the holding of test tubes.

The present invention has been described in relation to its preferred embodiments. One of ordinary skill, after reading the foregoing specification, will be able to effect various changes and substitutions of equivalents without departing from the broad concepts disclosed herein. It is therefore intended that the protection afforded by Letters Patent granted hereon be limited only by the definition contained in the appended claims and equivalents thereof.

The embodiments of the invention in which an exclusive property or privilege is claimed are defined as follows:

1. A single-piece injection molded rack comprising:
a plurality of spaced-apart superposed tiers including a top tier, a bottom tier, and an intermediate tier, said intermediate tier being disposed between said top and bottom tiers, said top tier including apertures, said intermediate tier having a top set of bars and a bottom set of bars, selected bars within said top set being superposed over and intersecting with selected bars within said bottom set to define apertures, selected apertures in said intermediate tier being operatively aligned with selected apertures in said top tier;
first support means for interconnecting said top tier and said intermediate tier; and
second support means for interconnecting said intermediate tier and said bottom tier.

2. The rack of claim 1, wherein each of said tiers includes a peripheral portion defining edges, the edges of said top tier being aligned with the edges of said intermediate tier, the edges of said intermediate tier being aligned with the edges of said bottom tier, and wherein:
said first support means interconnects a selected portion of the edges of said top tier with a selected portion of the edges of said intermediate tier; and
said second support means interconnects a selected portion of the edges of said intermediate tier with a selected portion of the edges of said bottom tier.

3. The rack of claim 1, wherein each of said tiers includes a peripheral portion having opposed front and rear edges and opposed left and right side edges; the front, rear, left side, and right side edges of the top tier being aligned with the front, rear, left side, and right side edges, respectively, of the intermediate tier; and wherein the front, rear, left side, and right side edges of the intermediate tier are aligned with the front, rear, left side, and right side edges, respectively, of the bottom tier, and wherein:
said first support means is located inward from the respective edges of said top and intermediate tiers.

4. The rack of claim 1, wherein each of said tiers includes a peripheral portion having opposed front and rear edges and opposed left and right side edges; the front, rear, left side, and right side edges of the top tier being aligned with the front, rear, left side, and right side edges, respectively, of the intermediate tier; and wherein the front, rear, left side, and right side edges of the intermediate tier are aligned with the front, rear, left side, and right side edges, respectively, of the bottom tier, and wherein:
said second support means is located inward from the respective edges of said intermediate and bottom tiers.

5. The rack of claim 4, wherein said first support means is located inward from the respective edges of said top and intermediate tiers.

6. The rack of claim 1, wherein said top set of bars comprises groups of bars, the bars within each group being substantially parallel.

7. The rack of claim 1, wherein said bottom set of bars comprises groups of bars, the bars within each group being substantially parallel.

8. The rack of claim 7, wherein said top set of bars comprises groups of bars, the bars within each group being substantially parallel.

9. The rack of claim 1, wherein the bars within said top set are substantially parallel to one another and wherein the bars within said bottom set are substantially parallel to one another.

10. The rack of claim 9, wherein said top and bottom bars extend between edges of said intermediate tier.

11. The rack of claim 10, wherein each bar of said top set intersects each bar of said bottom set at substantially right angles.

12. The rack of claim 1, wherein each bar of said top set intersects each bar of said bottom set at substantially right angles.

13. The rack of claim 3, wherein:
each of the bottom bars of said intermediate tier has a substantially planar upper surface; and
each of the top bars of said intermediate tier has a substantially planar lower surface.

14. The rack of claim 13, wherein the upper surfaces of said bottom bars are substantially coplanar with one another.

15. The rack of claim 13, wherein the lower surfaces of said top bars are substantially coplanar with one another.

16. The rack of claim 13, wherein the upper surfaces of said bottom bars and the lower surfaces of said top bars are substantially coplanar with one another.

17. The rack of claim 1, wherein each of said tiers includes a peripheral portion having opposed front and rear edges and opposed left and right side edges; the front, rear, left side, and right side edges of the top tier being aligned with the front, rear, left side, and right side edges, respectively, of the intermediate tier; and wherein the front, rear, left side, and right side edges of the intermediate tier are aligned with the front, rear, left side; and right side edges, respectively, of the bottom tier, and wherein:
the bars of said top set extend between the front and rear edges of said intermediate tier, and
the bars of said bottom set extend between the left side and right side edges of said intermediate tier.

18. The rack of claim 1, wherein said first support means comprises:
a left side support interconnecting the left side edge of said top tier with the left side edge of said intermediate tier; and
a right side support interconnecting the right side edge of said top tier with the right side edge of said intermediate tier, said second support means comprises:
- a front support interconnecting the front edge of said intermediate tier with the front edge of said bottom tier and
- a rear support interconnecting the rear edge of said intermediate tier with the rear edge of said bottom tier.

19. The rack of claim 18, further including at least one upper spacer extending between said top tier and said intermediate tier, said upper spacer being positioned inwardly of the edges of said tiers; and further including at least one lower spacer extending between said intermediate tier and said bottom tier, said lower spacer being positioned inwardly of the edges of said tiers.

20. The rack of claim 17, wherein said top tier has a substantially planar lower surface.

21. The rack of claim 17, wherein said bottom tier has a substantially planar upper surface.

22. The rack of claim 21, wherein said top tier has a substantially planar lower surface.

23. The rack of claim 17, wherein said top tier includes a lower surface having front and rear portions, said front and rear portions each being substantially planar but not coplanar with each other, said front and rear portions intersecting at a parting line located inward from the front and rear edges of said tier and downward toward said intermediate tier.

24. The rack of claim 23, wherein said bottom tier has a substantially planar upper surface.

25. The rack of claim 17, wherein said bottom tier includes an upper surface having left and right side portions, said left and right side portions each being substantially planar but not coplanar with each other, said left and right side portions intersecting at a parting line located inward from the left and right side edges of said tier and upward toward said intermediate tier.

26. The rack of claim 25, wherein said top tier has a substantially planar lower surface.

27. The rack of claim 17, wherein:
said top tier includes a lower surface having front and rear portions, said front and rear portions each being substantially planar but not coplanar with each other, said front and rear portions intersecting at a parting line located inward from the front and rear edges of said tier and downward toward said intermediate tier; and
said bottom tier includes an upper surface having left and right side portions, said left and right side portions each being substantially planar but not coplanar with each other, said left and right side portions intersecting at a parting line located inward from the left and right side edges of said tier and upward toward said intermediate tier.

28. The rack of claim 18, wherein:
said left and right side supports have substantially planar inner surfaces, said surfaces being disposed opposite one another and in planes which are substantially parallel to one another and to said top set of bars; and
said front and rear supports have substantially planar inner surfaces, said surfaces being disposed opposite one another and in planes which are substantially parallel to one another and to said bottom set of bars.

29. The rack of claim 18, wherein a portion of one of the edges of said intermediate tier extends outward relative to the respective edge of the bottom tier aligned therewith.

30. The rack of claim 18, wherein the front edge of said intermediate tier extends outward relative to the front edge of said bottom tier.

31. The rack of claim 18, wherein the edges of each tier define a generally rectangular periphery and wherein each bar of said top set intersects each bar of said bottom set at substantially right angles.

32. The rack of claim 31, wherein the rectangular periphery of each tier substantially corresponds in shape and dimensions with the shape and dimensions of the rectangular periphery of each of the other tiers.

33. The rack of claim 32, wherein the front, rear, left side, and right side edges of each tier are aligned substantially coplanar with the front, rear, left side, and right side edges, respectively, of each of the other tiers.

34. The rack of claim 33, wherein said bottom tier further includes apertures, selected apertures in said bottom tier being operatively aligned with selected apertures in said top and intermediate tiers.

35. The rack of claim 34, wherein said top and bottom bars define generally square apertures.

36. The rack of claim 35, wherein said top tier has generally square apertures.

* * * * *